United States Patent
Cannon et al.

(10) Patent No.: US 7,550,730 B1
(45) Date of Patent: Jun. 23, 2009

(54) METHOD FOR DETECTING ALPHA PARTICLES IN SOI TECHNOLOGY

(75) Inventors: Ethan H. Cannon, Essex Junction, VT (US); Michael J. Hauser, Bolton, VT (US); Timothy D. Sullivan, Underhill, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/099,304

(22) Filed: Apr. 8, 2008

(51) Int. Cl.
*G01T 1/178* (2006.01)

(52) U.S. Cl. .............................. 250/370.02

(58) Field of Classification Search ............ 250/370.01, 250/370.02, 370.05
See application file for complete search history.

(56) References Cited

U.S. PATENT DOCUMENTS

| | | | |
|---|---|---|---|
| 4,413,327 A | 11/1983 | Sabo et al. | |
| 4,464,752 A | 8/1984 | Schroeder et al. | |
| 4,931,990 A | 6/1990 | Perkin | |
| 5,022,027 A | 6/1991 | Rosario | |
| 5,331,164 A * | 7/1994 | Buehler et al. | 250/370.02 |
| 5,604,755 A | 2/1997 | Bertin et al. | |
| 5,705,807 A * | 1/1998 | Throngnumchai et al. | 250/214 P |
| 6,275,747 B1 | 8/2001 | Wada et al. | |
| 6,828,561 B2 * | 12/2004 | Norman et al. | 250/370.02 |
| 6,986,078 B2 | 1/2006 | Rodbell et al. | |
| 6,995,376 B2 * | 2/2006 | Cottrell et al. | 250/370.14 |
| 7,057,180 B2 * | 6/2006 | Fifield et al. | 250/370.02 |
| 7,166,847 B2 | 1/2007 | Hannah | |
| 7,271,389 B2 | 9/2007 | August et al. | |
| 7,375,339 B2 * | 5/2008 | Abadeer et al. | 250/370.07 |
| 2001/0022521 A1 * | 9/2001 | Sasaki et al. | 326/113 |
| 2004/0227094 A1 * | 11/2004 | Tompa et al. | 250/370.01 |
| 2005/0003612 A1 * | 1/2005 | Hackler et al. | 438/257 |
| 2006/0010346 A1 | 1/2006 | Minemier | |
| 2007/0252088 A1 * | 11/2007 | Abadeer et al. | 250/370.07 |
| 2007/0283193 A1 | 12/2007 | Lewis et al. | |
| 2008/0128629 A1 * | 6/2008 | Abadeer et al. | 250/370.07 |

* cited by examiner

*Primary Examiner*—David P Porta
*Assistant Examiner*—David S Baker
(74) *Attorney, Agent, or Firm*—Richard Kotulak; Greenblum & Bernstein P.L.C.

(57) ABSTRACT

The invention relates to a method of detecting alpha particles in SOI technology and a circuit thereof. The structure is a silicon-on-insulator radiation detector which includes: a charge collection node; a precharge transistor that has a source from the charge collection node, a drain at Vdd, and a gate controlled by a precharge signal; an access transistor that has a source from the charge collection node, a drain connecting to a readout node, and a gate controlled by a read-out signal; and a detector pulldown transistor having a drain from the charge collection node, a source to ground, and a grounded gate.

4 Claims, 3 Drawing Sheets

METHOD FOR DETECTING ALPHA PARTICLES IN SOI TECHNOLOGY

CROSS-REFERENCE TO RELATED APPLICATIONS

This application is related to U.S. Ser. No. 12/099,307 and filed on the same day and currently pending.

FIELD OF THE INVENTION

The present invention generally relates to a method for detecting alpha particles in SOI technology.

BACKGROUND OF THE INVENTION

Ionizing radiation can cause single event upsets (SEUs) in semiconductor ICs. Ionizing radiation can directly upset storage circuits, such as SRAMs, register files and flip-flops. Moreover, radiation events in combinational logic create voltage glitches that can be latched. SEUs may cause the IC to perform incorrect or illegal operations.

Methods to prevent SEUs include adding spatial and/or temporal redundancy, so that a single radiation event cannot cause an SEU. Redundancy solutions incur area, power and performance penalties. Consequently, there is a need to improve detection schemes of radiation events in ICs.

An array of SOI SRAM cells has been proposed to detect alpha particles from neutrons that interact with a neutron conversion layer. Alpha particles hitting the sensitive area of an SRAM cell cause an SEU. While the SEU rate of SRAMs from alpha particles is very large for high reliability applications, the sensitive area of an SRAM cell is a small fraction of the total cell area.

Another SOI ionizing radiation monitor consists of a diode below the buried oxide connected to a circuit, such as a domino circuit. This requires special process steps to form the diode below the BOX. Another SOI radiation detector consists of a PNPN structure in the active device layer and a PN gate. The detector enters a high current latchup state to detect radiation.

Accordingly, there exists a need in the art to overcome the deficiencies and limitations described hereinabove.

SUMMARY OF THE INVENTION

In a first aspect of the invention, a method of detecting radiation, comprises: charging an internal node through a precharge device; turning a detector pulldown device on upon a radiation event thereby discharging the radiation event from the detector pulldown device to ground; and writing a state of the internal node through an access device to a bitline, wherein high indicates no event and low indicates the radiation event.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

The present invention generally relates to a method for detecting alpha particle radiation in SOI technology and a circuit thereof. More specifically, the present invention teaches an SOI radiation sensor cell and design structure thereof. The SOI radiation sensor cell of the present invention includes three transistors: a precharge NFET, a detector NFET and an access NFET. In embodiments, a reset signal charges an internal node through the precharge device and a radiation event on the detector pulldown device discharges the node. When a Read Enable signal is exercised, the access device writes the node state to the bitline, where high indicates no event and low indicates a radiation event. The SOI radiation sensor does not enter a high current state when it detects radiation and will use less power than the PNPN structure. The SOI radiation sensor is formed by standard processing steps, and is cheaper than the ioninizing radiation monitor which requires special processing steps.

Figure 1:
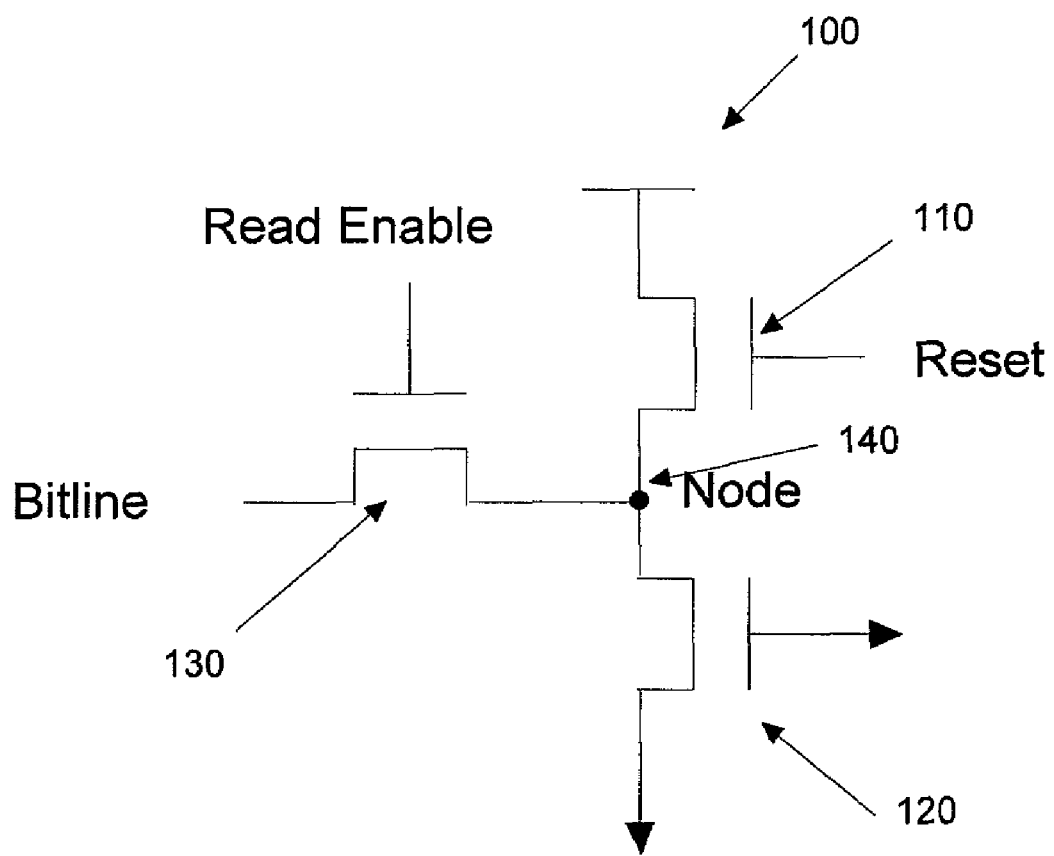
FIG. 1 shows a schematic of an SOI radiation detector in accordance with the invention.

FIG. 1 shows a schematic of a SOI radiation detector in accordance with the invention. In embodiments, the SOI radiation sensor cell 100 of the present invention includes three transistors: a precharge NFET (reset) 110, a detector NFET (detector pulldown device) 120 and an access NFET (access device) 130. An internal node 140 is connected to all of the devices, as discussed below in more detail.

More specifically, the precharge NFET (reset) 110 has a source from the node (charge collection node) 140, a drain at Vdd, and a gate controlled by a precharge signal. The access NFET (access device) 130 has a source from the charge collection node 140, a drain connecting to a readout node, and a gate controlled by a read-out signal. The detector pulldown device 120 has a drain from the charge collection node, a source to ground, and a grounded gate.

In embodiments, a reset signal charges the internal node 140 through the precharge device 110. This will charge the node. A radiation event on the detector pulldown device 130 discharges the node; that is, a radiation event will turn the detector pulldown device on which, in turn, discharges the node to ground. When a Read Enable signal is exercised, the access device 130 writes the node state to the bitline, where high indicates no event and low indicates a radiation event. As such, when there is no radiation event, the node 140 remains charged (by the reset) and the output is high; whereas, when there is a radiation event, the node 140 will discharge to ground and the output is low.

To increase the sensitive area in each cell, multiple detector pulldown devices may be connected in parallel, since an event on any detector pulldown device will discharge the node. The sensitive area of the SOI radiation sensor cell comprises a larger fraction of the sensor cell area compared to an SRAM cell, so the SOI radiation sensor will have larger detection efficiency. The SOI radiation sensor does not enter a high current state when it detects radiation and will use less power than the PNPN structure.

Figure 2:
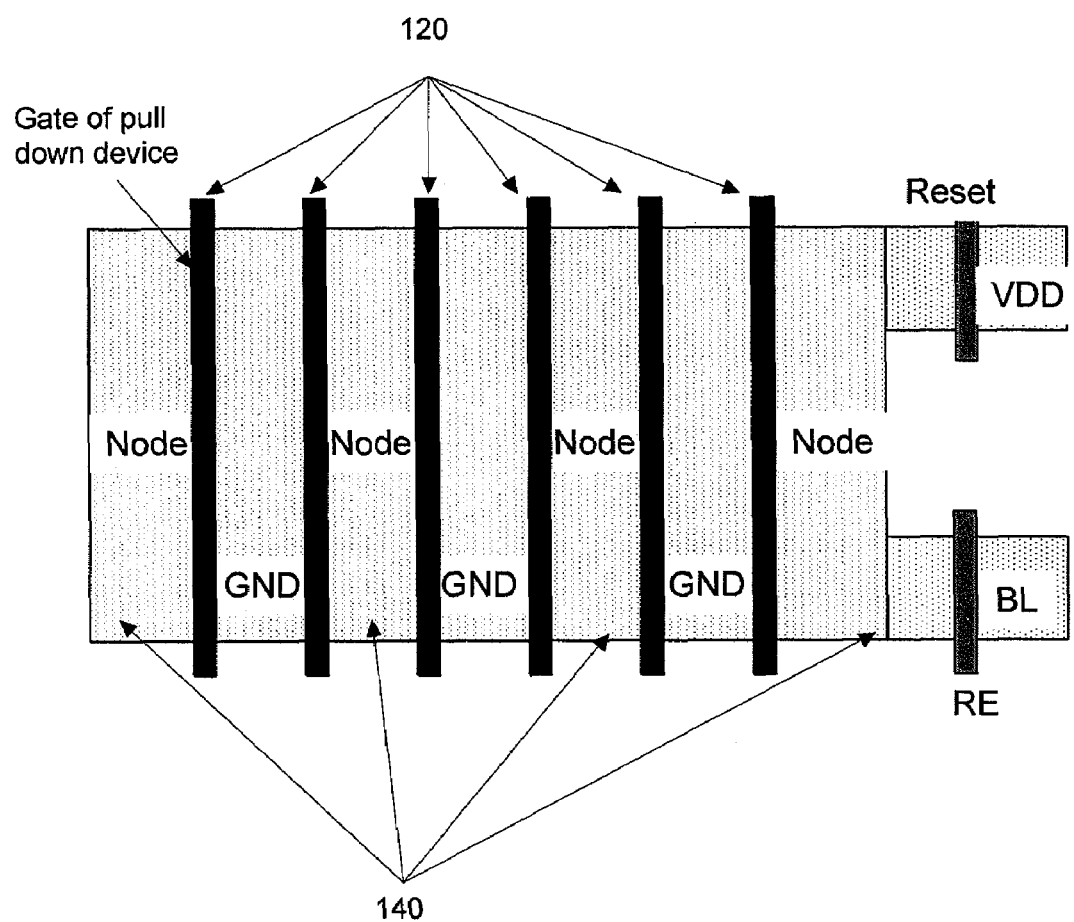
FIG. 2 shows a layout of the SOI radiation detector in accordance with the invention.

FIG. 2 shows a layout of the SOI radiation detector in accordance with the invention. To increase the sensitive area in each cell, multiple detector pulldown devices may be connected in parallel, since an event on any one of the detector pulldown devices will discharge the node. To increase the fraction of the sensor cell sensitive to radiation, the precharge and access device have a smaller gate width than the detector pulldown device(s).

In particular, the layout of the SOI detector of FIG. 2 shows six detector pulldown devices 120 in parallel. In FIG. 2, the radiation sensor is fabricated in an SOI wafer. Preferentially, the wafer has a very thick SOI layer (250 nm) to increase the charge collection volume. Preferentially, the source and drain implants do not extend to the BOX layer, so that holes generated in the source/drain diffusions are collected in the body, charging the body and causing a parasitic bipolar response.

As shown further in FIG. 2, the SOI radiation detector comprises the three transistors. The reset signal is used to charge the internal nodes 140, which are connected together via a metal wire (not shown). A radiation event on the detector pulldown device 120 discharges the node(s) 140. When the Read Enable signal is exercised, the access device writes the node state to the bitline (BL) (high indicates no event; low indicates a radiation event).

For SOI devices with thick SOI layer and source and drain implants that do not extend to the BOX, the body, source and drain serve as collection areas. SOI circuits can be designed with Qcrit of approximately 1 fC. Depending on their energy, alpha particles generate 4-13 fC/um in silicon, so the alpha particle path length through the SOI layer would need to be about 0.08-0.25 um. Having an SOI layer thickness of 0.25 um allows detection of alpha particles of any energy and angle that hits the sensitive region.

As an alternate embodiment, the precharge device consists of a PMOS transistor. Using a PMOS transistor charges NODE to Vdd, without the diode drop of an NMOS precharge device. A PMOS precharge transistor requires more area than an NMOS precharge transistor when placed in its own silicon island. The area penalty of a PMOS precharge transistor can be minimized by using butted junctions and mirroring sensors.

Figure 3:
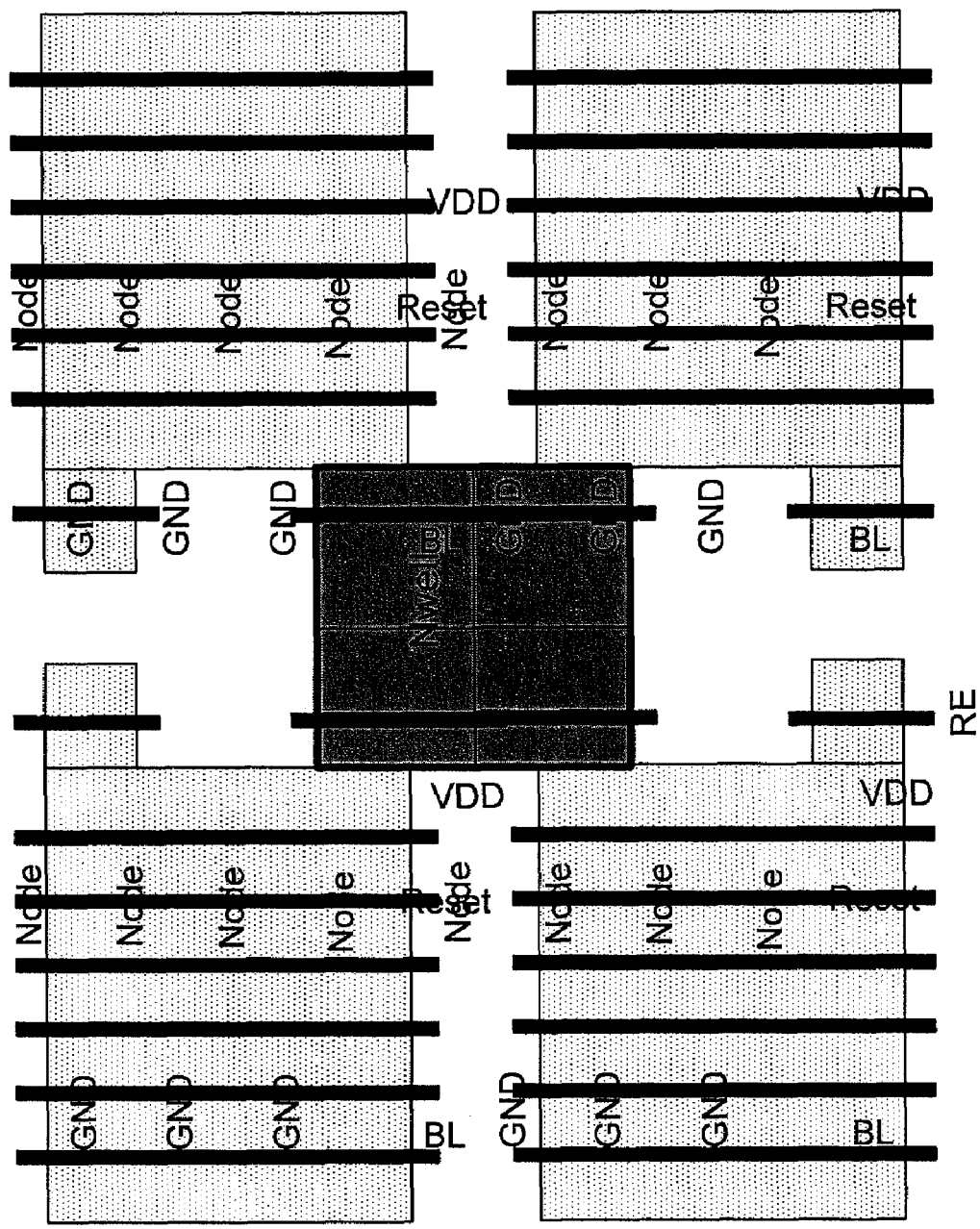
FIG. 3 shows a layout of four SOI radiation detectors in accordance with the invention.

FIG. 3. shows a layout of four SOI radiation detectors, each with six detector pulldown devices in parallel. The PMOS precharge devices are in a shared Nwell with their drains abutting drains of NMOS precharge devices.

While the invention has been described in terms of embodiments, those of skill in the art will recognize that the invention can be practiced with modifications and in the spirit and scope of the appended claims.

What is claimed is:

1. A method of detecting radiation, comprising:
   charging an internal node through a precharge device;
   turning a detector pulldown device on upon a radiation event thereby discharging the radiation event from the detector pulldown device to ground; and
   writing a state of the internal node to an access device, wherein high indicates no event and low indicates the radiation event, wherein:
   the precharge device is provided with a source from the charge collection node, a drain at Vdd, and a gate controlled by a precharge signal;
   the detector pulldown device is provided with a drain from the charge collection node, a source to ground, and a grounded gate; and
   the access device is provided with a source from the charge collection node, a drain connecting to a readout node, and a gate controlled by a read-out signal.

2. The method of claim 1, further comprising forming the internal node, the detector pulldown device and the bitline on a silicon layer formed on an insulating substrate, the silicon layer including shallow implanted regions that do not extend to the insulating substrate.

3. The method of claim 1, wherein when there is no radiation event, the internal node remains charged by the precharge device.

4. The method of claim 1, wherein when there is the radiation event, the internal node will discharge to ground and the event is low.

* * * * *